(12) United States Patent
Waki et al.

(10) Patent No.: US 9,488,966 B2
(45) Date of Patent: Nov. 8, 2016

(54) CONTROL DEVICE, INTEGRATED CIRCUIT, CONTROL METHOD, AND PROGRAM FOR CONTROLLING AN APPLIANCE PERFORMING DIFFERENT OPERATIONS

(75) Inventors: Yuki Waki, Osaka (JP); Hisashi Takayama, Osaka (JP); Tosihisa Ikeda, Kyoto (JP); Yasuo Yoshimura, Shiga (JP); Tetsuya Kouda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 388 days.

(21) Appl. No.: 14/237,666

(22) PCT Filed: Sep. 5, 2012

(86) PCT No.: PCT/JP2012/005616
§ 371 (c)(1),
(2), (4) Date: Feb. 7, 2014

(87) PCT Pub. No.: WO2013/046546
PCT Pub. Date: Apr. 4, 2013

(65) Prior Publication Data
US 2014/0180443 A1    Jun. 26, 2014

(30) Foreign Application Priority Data
Sep. 30, 2011    (JP) ................. 2011-217227

(51) Int. Cl.
*G05B 13/02*    (2006.01)
*G06Q 50/06*    (2012.01)
(Continued)

(52) U.S. Cl.
CPC ............ *G05B 13/02* (2013.01); *G06Q 10/06* (2013.01); *G06Q 30/04* (2013.01); *G06Q 50/06* (2013.01);
(Continued)

(58) Field of Classification Search
CPC G05B 13/042; G05B 13/024; G05B 13/048; H02J 3/14; H02J 3/32; H02J 3/383; H02J 2003/14; H02J 2003/143; A01B 12/006

USPC .......................................................... 700/28
See application file for complete search history.

(56) References Cited

U.S. PATENT DOCUMENTS 5,572,438 A   11/1996   Ehlers et al.
5,684,710 A   11/1997   Ehlers et al.
(Continued)

FOREIGN PATENT DOCUMENTS

JP    4-10999      1/1992
JP    6-165374     6/1994
(Continued)

OTHER PUBLICATIONS

Structured Computer Organization, By: Andrew S. Tanenbaum (Second Edition, ISBN: 0-13-854489-1).*
(Continued)

*Primary Examiner* — Robert Fennema
*Assistant Examiner* — Jigneshkumar Patel
(74) *Attorney, Agent, or Firm* — Wenderoth, Lind & Ponack, L.L.P.

(57) ABSTRACT

Provided is a control device that makes it possible to surely give an appropriate instruction to operate. An appliance control device that controls an electric appliance that performs one of a first operation and a second operation includes: a price obtaining unit that obtains information indicating a price of power; a detecting unit that detects a change in the price in a not shorter one of the first period and the second period, the price being indicated in the obtained information; a first calculating unit that calculates a first cost produced when the electric appliance performs the first operation, in the case where the change is detected; a second calculating unit that calculates a second cost produced when the electric appliance performs the second operation, in the case where the change is detected; a comparing unit; and an instructing unit that instructs performing of a determined operation.

8 Claims, 15 Drawing Sheets

(51) Int. Cl.
  *G06Q 10/06* (2012.01)
  *G06Q 30/04* (2012.01)
  *H02J 3/14* (2006.01)
  *H02J 3/38* (2006.01)
  *H02J 3/32* (2006.01)

(52) U.S. Cl.
  CPC .. *H02J 3/14* (2013.01); *H02J 3/32* (2013.01); *H02J 3/383* (2013.01); *H02J 2003/143* (2013.01); *H02J 2003/146* (2013.01); *Y02B 70/3225* (2013.01); *Y02B 70/3266* (2013.01); *Y02E 10/563* (2013.01); *Y02E 10/566* (2013.01); *Y04S 20/222* (2013.01); *Y04S 20/224* (2013.01); *Y04S 20/242* (2013.01); *Y04S 50/12* (2013.01)

(56) References Cited

U.S. PATENT DOCUMENTS

| | | |
|---|---|---|
| 5,696,695 A | 12/1997 | Ehlers et al. |
| 2006/0276938 A1 | 12/2006 | Miller |
| 2011/0098869 A1* | 4/2011 | Seo .................. G01D 4/004 700/296 |
| 2011/0125337 A1 | 5/2011 | Zavadsky et al. |
| 2011/0196547 A1 | 8/2011 | Park et al. |
| 2012/0323390 A1 | 12/2012 | Kobayasi |

FOREIGN PATENT DOCUMENTS

| | | |
|---|---|---|
| JP | 10-510138 | 9/1998 |
| JP | 2006-149788 | 6/2006 |
| JP | 2007-236538 | 9/2007 |
| JP | 2009-47334 | 3/2009 |
| JP | 2010-259186 | 11/2010 |
| JP | 2011-166884 | 8/2011 |
| WO | 96/21264 | 7/1996 |
| WO | 2011/052957 | 5/2011 |

OTHER PUBLICATIONS

Extended European Search Report issued Feb. 25, 2015 in corresponding European Application No. 12836930.3.
International Search Report issued Dec. 4, 2012 in corresponding International Application No. PCT/JP2012/005616.

* cited by examiner $$C_{M1} = p_1 \times W_{M1} \times (t_x - t_1) + p_2 \times W_{M1} \times (t_{M1} - t_x)$$

$$C_{M2} = p_1 \times W_{M1} \times (t_2 - t_1) + p_1 \times W_{M2} \times (t_{M2} - t_2)$$

$$C_{M1} = \int_{t_1}^{t_{M1}} (p_e(t) \times w_{M1}(t - t_1))dt$$

$$C_{M2} = \int_{t_1}^{t_2}(p_e(t) \times w_{M1}(t - t_1))dt + \int_{t_2}^{t_{M2}}(p_e(t) \times w_{M2}(t - t_1'))dt$$

$$C_{M2} < C_{M1}$$

FIG. 9B $$C_{M1} = \int_{t_1}^{t_{M1}} \{p_g(t) \times \min(W_g(t), W_{M1}(t - t_1)) + p_e(t) \times \max(W_{M1}(t - t_1) - W_g(t), 0)\} dt$$

$$C_{M2} = \int_{t_1}^{t_2} \{p_g(t) \times \min(W_g(t), W_{M1}(t - t_1)) + p_e(t) \times \max(W_{M1}(t - t_1) - W_g(t), 0)\} dt$$

$$+ \int_{t_2}^{t_{M2}} \{p_g(t) \times \min(W_g(t), W_{M2}(t - t_1')) + p_e(t) \times \max(W_{M2}(t - t_1') - W_g(t), 0)\} dt$$

FIG. 9C $$C_{M1} = \int_{t_1}^{t_{M1}} (p_e(t) \times W_{M1}(t - t_1))dt + P_{initial} \overset{1er}{/} N_{M1}$$

FIG. 10C $$C_{M2} = \int_{t_1}^{t_2}(p_e(t) \times W_{M1}(t - t_1))dt + \frac{t_2 - t_1}{t_{M1} - t_1}(P_{initial} / N_{M1}) + \frac{t_{M2} - t_2}{t_{M2} - t_1}(P_{initial} / N_{M2})$$
$$+ \int_{t_2}^{t_{M2}}(p_e(t) \times W_{M2}(t - t_1'))dt$$

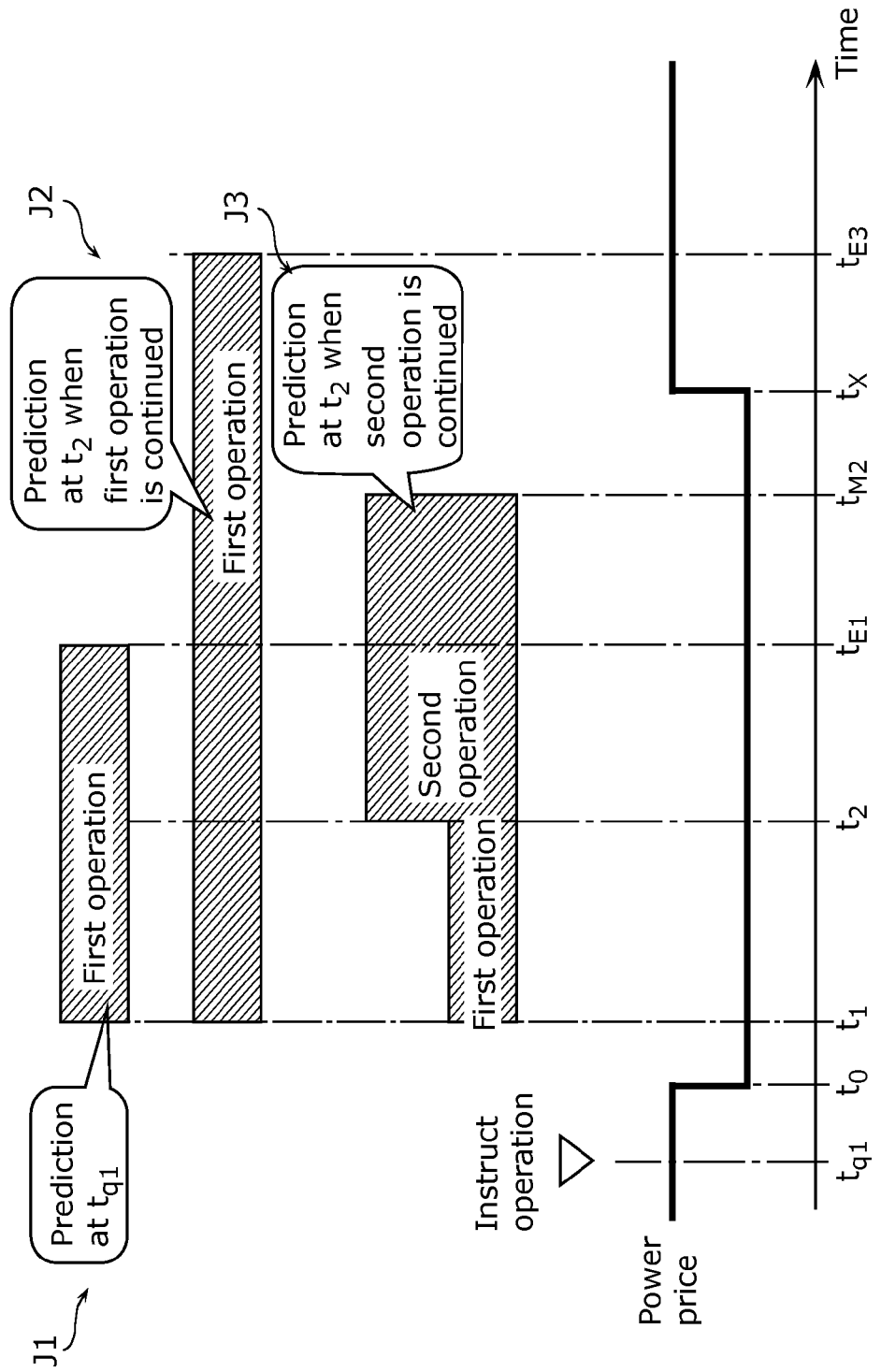

CONTROL DEVICE, INTEGRATED CIRCUIT, CONTROL METHOD, AND PROGRAM FOR CONTROLLING AN APPLIANCE PERFORMING DIFFERENT OPERATIONS

TECHNICAL FIELD

The present invention relates to a control device that obtains information indicating a unit price of power, calculates a cost produced when an electric appliance operates, and gives the electric appliance an instruction to operate, based on the calculated cost.

BACKGROUND ART

A control device has been so far available which holds information indicating a time period in which a unit price of power is less expensive according to a midnight power rate system or a time-of-day power rate system, and gives an electric appliance an instruction to operate in the time period in which the unit price of power is less expensive (see Patent Literatures (PTLs) 1 and 2, for instance).

It is to be noted that the electric appliance is, for example, a home appliance such as a washing and drying machine and a dish washing and drying machine, or a heat pump water heater, which are provided in an ordinary family house.

There is a case where the control device is provided as part of such an electric appliance.

There is also a case where the control device is provided outside of the electric appliance. For instance, examples of the control device outside of the electric appliance include a control device that communicates with at least two electric appliances provided in a house and gives each of the at least two electric appliances an instruction based on a cost of the electric appliance.

CITATION LIST

Patent Literature

[PTL 1] Japanese Unexamined Patent Application Publication No. 06-165374
[PTL 2] Japanese Unexamined Patent Application Publication No. 2009-047334

SUMMARY OF INVENTION

However, the existing control device fails to give an electric appliance an appropriate instruction to operate at a relatively low cost, and sometimes gives the electric appliance an inappropriate instruction to operate at a relatively high cost.

In view of this, the present invention provides a control device that makes it possible to avoid giving an electric appliance an inappropriate instruction to operate at a high cost, and to more surely give the electric appliance an appropriate instruction to operate at a low cost.

A control device according to an aspect of the present invention is a control device that controls an electric appliance that performs one of a first operation during a first period and a second operation during a second period, the control device including: a price obtaining unit configured to obtain information indicating a price of power; a detecting unit configured to detect a change in the price in a not shorter one of the first period and the second period, the price being indicated in the obtained information; a first calculating unit configured to calculate a first cost produced when the electric appliance performs the first operation, in the case where the change is detected; a second calculating unit configured to calculate a second cost produced when the electric appliance performs the second operation, in the case where the change is detected; a comparing unit configured to compare the first cost and the second cost to determine which one of the first operation and the second operation produces a not higher one of the first cost and the second cost; and an instructing unit configured to instruct the electric appliance to perform the determined one of the first operation and the second operation.

This general and specific aspect may be implemented using a system, a method, an integrated circuit, a computer program, or a computer-readable recording medium such as a CD-ROM, or any combination of systems, methods, integrated circuits, computer programs, or computer-readable recording media.

A control device according to the present invention makes it possible to avoid giving an electric appliance an instruction to operate at a high cost, and to more surely give the electric appliance an appropriate instruction to operate at a low cost.

In addition, the control device makes it possible to give the electric appliance not the inappropriate instruction but the appropriate instruction even when a unit price of power changes in a period during which the electric appliance operates.

BRIEF DESCRIPTION OF DRAWINGS

FIG. 9B shows an equation according to Modification 1.

FIG. 9C shows an equation according to Modification 1.

FIG. 10C shows an equation according to Modification 2.

FIG. 13 is a diagram showing operations according to Modification 5.

DETAILED DESCRIPTION OF THE INVENTION

Underlying Knowledge Forming Basis of the Present Invention

In relation to the control device disclosed in the Background Art section, the inventors have found the following problem.

The problem is described in detail with reference to FIG. 1.

Figure 1:
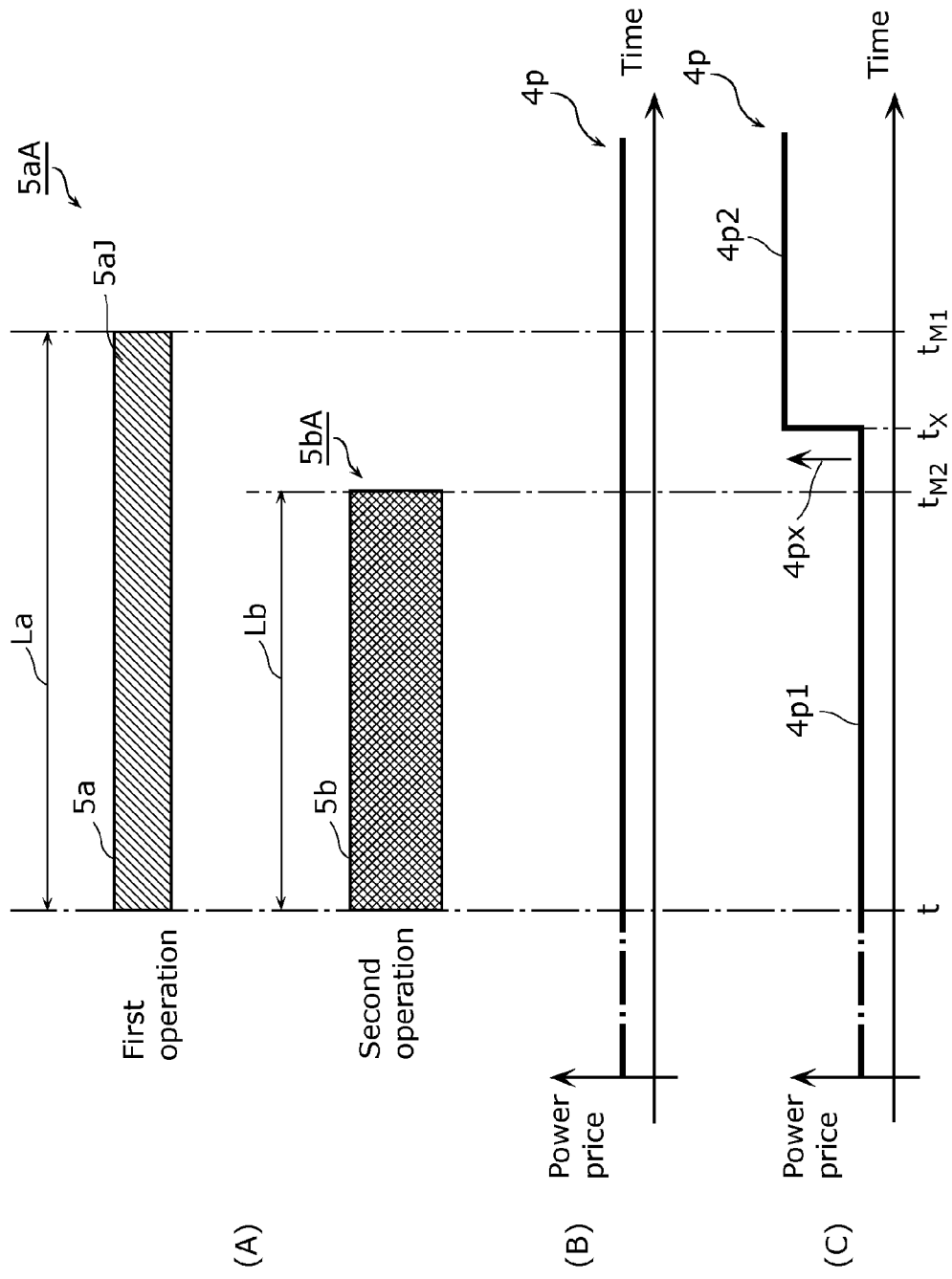
FIG. 1 is a diagram of which (A) shows an operation period and power consumption of an electric appliance, and (B) and (C) each show a power price.

FIG. 1 is a diagram of which (A) schematically shows a relationship between an operation period and power consumption of an electric appliance, and (B) and (C) each show a change in a price per unit amount of power (price 4p).

5a in the upper half of (A) shows, at a time when a first operation is performed, an operation period La from when the operation starts at time t to when the operation ends at time $t_{M1}$, and power consumption in the operation period La. In other words, the length of 5a in the horizontal axis direction represents a length of the operation period La, and the width of 5a in the vertical axis direction represents power consumption at each time. Thus, the area of 5a represents a total amount of consumed power from the start to end of the operation (amount of power 5aA). The first operation needs a long time for completion, but consumes less power. Besides, the first operation has a relatively small total amount of consumed power from the start to end of the operation.

5b in the lower half of (A) shows, at a time when a second operation is performed, an operation period Lb from when the operation starts at the time t to when the operation ends at time $t_{M2}$, and power consumption in the operation period Lb. The second operation needs a short time for completion, but consumes more power. The second operation has a relatively large total amount of consumed power (amount of power 5bA) from the start to end of the operation. To put it another way, the second operation has the total amount of consumed power larger than the total amount of consumed power (amount of power 5aA) shown in the upper half.

In each of (B) and (C), 4p shows a price per unit amount of power (unit price of power).

A change in the unit price of power in an operation period of an electric appliance is assumed to include a case shown by (B) and a case shown by (C) of FIG. 1.

First, in the case shown by (B), the unit price of power 4p is fixed until the operation end time $t_{M1}$ in the case where the first operation (the upper half of (A)) that needs a long time to end is performed.

Here, as stated above, the total amount of consumed power (amount of power 5aA) when the first operation is performed (the upper half of (A)) is smaller than the total amount of consumed power (amount of power 5bA) when the second operation is performed (the lower half of (A)).

For this reason, in the case shown by (B), a cost produced when an operation shown in the upper half of (A) (the first operation) is performed is lower than a cost produced when an operation shown in the lower half of (A) (the second operation) is performed, and the first operation can be performed at the lower cost.

In contrast, in the case shown by (C) of FIG. 1, the unit price of power 4p rises at time $t_x$ that is earlier than the time $t_{M1}$.

For this reason, there is the rise in the unit price of power 4p (price 4px) obtained by subtracting a unit price 4p1 before the rise from a unit price 4p2 after the rise.

A first product is obtained by multiplying together the price 4px and an amount of power 5aJ consumed during a period from the times $t_x$ to $t_{M1}$ in the case where the first operation is performed (the upper half of (A)).

On the other hand, there are the total amount of consumed power (amount of power 5aA) when the first operation is performed (the upper half of (A)), and the total amount of consumed power (amount of power 5bA) when the second operation is performed (the lower half) and which is larger than the total amount of consumed power 5aA.

Stated differently, a second product is also obtained by multiplying together a unit price of power before the time $t_x$ and the rise (price 4p1), and a difference between the larger total amount of consumed power (amount of power 5bA) shown in the lower half and the smaller total amount of consumed power (amount of power 5aA) shown in the upper half.

In short, in the case shown by (C), the cost produced when the operation shown in the lower half of (A) is performed includes not the first product regarding the price 4px resulting from the rise but the second product regarding the difference between the two amounts of power.

The first product not included in the cost in the lower half of (A) is assumed to be sometimes larger than the second product included in the cost.

In this case, the cost produced when the second operation that ends at the time $t_{M2}$ which is before the unit price of power rises is performed (the lower half of (A)) is lower than the cost produced when the first operation is performed (the upper half of (A)), and the second operation can be performed at the lower cost.

For this reason, while the cost in the upper half of (A) is lower in the case shown by (B), the cost in the lower half of (A) is lower in the case shown by (C).

As a result, it is assumed that because an instruction to perform the operation in the upper half of (A) is given in the case shown by (B) and an inappropriate instruction that results in the higher cost than the upper half of (A) is further given also in the case shown by (C), it is impossible to give an appropriate instruction.

It is to be noted that a time at which it is known that the unit price of power 4p would rise at the time $t_x$ is sometimes not the time t of the start of the operation but a time later than the time t of the start of the operation. In this case also, the above problem may arise.

To put it another way, the time t described with reference to FIG. 1 is not an operation start time but a time that is later than the operation start time and at which a change in the unit price of power 4p is detected. The time $t_{M1}$ is read as an operation end time in the case where the first operation is continuously performed (the upper half of (A)) after the time t (time $t_x$). In addition, the time $t_{M2}$ is read as an operation end time in the case where the second operation is switched to and performed (at the time $t_x$).

The aforementioned description can similarly apply to this case, and there is clearly a possibility that the aforementioned problem also arises in the case.

The following describes an aspect of the present invention with reference to the drawings.

In order to solve such a problem, an appliance control device 2 according to the aspect of the present invention is an appliance control device 2 that controls an electric appliance 1e (e.g., an electric appliance 1e1) that performs one of a first operation (operation of which a necessary period is a first period (e.g., a period between times $t_2$ and $t_{M1}$ in FIG. 7C) when the first operation is performed) during the first period and a second operation (operation shown in z3) during a second period (a period between times $t_2$ and $t_{M2}$), the appliance control device 2 including: a price obtaining unit 21 configured to obtain information 4 indicating a price ($p_e(t)$) of power 1eP (FIG. 3); a detecting unit 22 configured to detect a change in the price (e.g., a change at time $t_x$ in FIG. 5) in a not shorter one of the first period and the second period, the price being indicated in the obtained information; a first calculating unit 23 configured to calculate a first cost (information) 23c produced when the electric appliance 1e performs the first operation, in the case where the change is detected; a second calculating unit 24 configured to calculate a second cost 24c produced when the electric appliance 1e performs the second operation, in the case where the change is detected; a comparing unit 26 configured to compare the first cost 23c and the second cost 24c to determine which one of the first operation and the second operation produces a not higher one of the first cost and the second cost; and an instructing unit 25 (refer to an instruction 25s) configured to instruct the electric appliance 1e to perform the determined one of the first operation and the second operation.

Figures 7B, 7C, 7D:
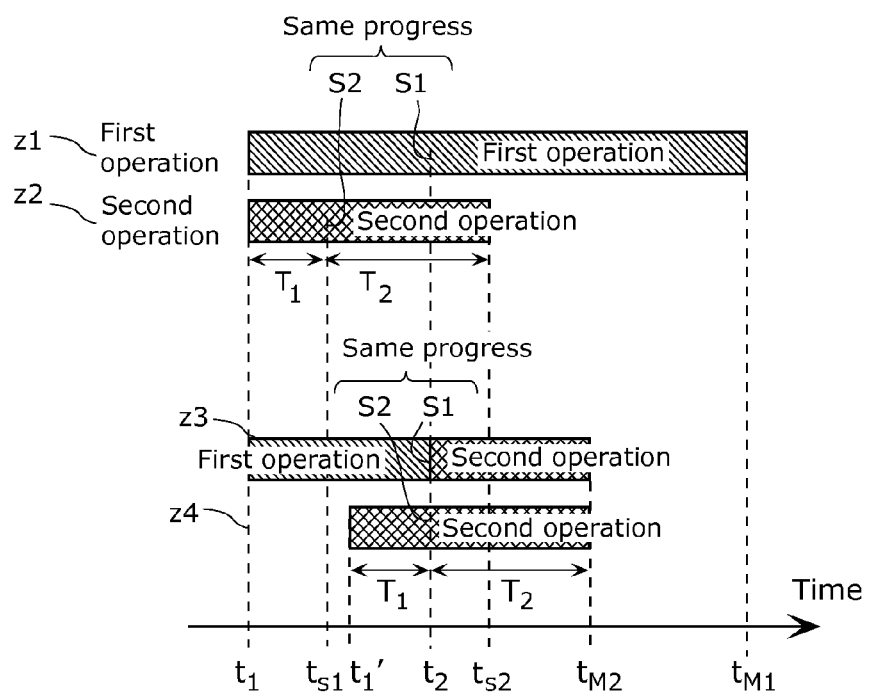
FIG. 7B shows an exemplary equation for a second cost.
FIG. 7C is a diagram illustrating a time.
FIG. 7D shows a determination condition.

Regarding the price of power 1eP ($p_e(t)$), not only a first case where the price of power does not change (refer to (B) in FIG. 1) but also a second case where the price of power changes (refer to (C)) are assumed in the not shorter one of the first period and the second period (the period between times $t_2$ and $t_{M1}$ in FIG. 7C).

In the first case, even when a process for instructing an operation determined based on the calculated two costs is not performed, it appears that an appropriate instruction to perform a proper operation that produces a relatively small, reasonable cost is given based only on an amount of power consumption when the electric appliance 1e performs the first operation or the second operation.

In other words, in the second case, it is assumed that when the above process is not performed, the appropriate instruction is not given, and only when the process is performed, the appropriate instruction is given.

In view of this, when not the first case but the second case is determined by detecting the change in the above period (refer to (C) in FIG. 1), the process is performed.

With this, it is possible to avoid giving the aforementioned "inappropriate instruction to operate at a high cost" when the process is not performed to give the appropriate instruction, and to give the appropriate instruction "to operate at a low cost."

Eventually, in addition to giving the appropriate instruction in the first case, the appropriate instruction is also given in the second case, and thus the appropriate instruction is more surely given in either case.

To put it another way, when the price of power changes in the above period (the period during which the electric appliance operates), and the second case ((C) in FIG. 1) where such a change exists occurs, the appropriate instruction can be given.

It is to be noted that the appliance control device 2 may further include a state obtaining unit configured to obtain, from the electric appliance 1e, information 27Ia indicating an operation state (e.g., a length of a period between times $t_1$ and $t_2$ in an example shown in FIG. 7C) of the electric appliance 1e.

The first operation may consume first power $W_{M1}$ (FIG. 5) that is power consumed by the electric appliance 1e in the first period, and the second operation may consume second power $W_{M2}$ that is power consumed in the second period, the second power $W_{M2}$ being different from the first power $W_{M1}$.

The appliance control device 2 may further include a predicting unit configured to predict an amount of surplus power $w_g(t)$ based on an amount of power consumed by a different electric appliance (electric appliance 1e2) from the electric appliance 1e (e.g., the electric appliance 1e1), and an amount of power generated by a photovoltaic power generation system 1g, wherein the first calculating unit 23 and the second calculating unit 24 may calculate the first cost and the second cost, respectively, based on the price indicated in the information 4 obtained by the price obtaining unit 21, the predicted amount of surplus power $w_g(t)$, and power consumption of the electric appliance (e.g., the electric appliance 1e2) which the instructing unit 25 instructs to perform the determined one of the first operation and the second operation.

The first calculating unit and the second calculating unit may calculate the first cost and the second cost, respectively, based on the price indicated in the information 4 obtained by the price obtaining unit 21, and a depreciation converted from a cost of quality deterioration of the electric appliance 1e (the electric appliance 1e1) that is instructed to perform the determined one of the first operation and the second operation.

The detecting unit may detect a change of an estimated operation end time (e.g., change from $t_{E1}$ to $t_{E3}$ in FIG. 13) of the electric appliance 1e (the electric appliance 1e1) of which the operation state is indicated, based on the obtained information (information 27Ib) indicating the operation state of the electric appliance 1e.

This general and specific aspect may be implemented using a system, a method, an integrated circuit, a computer program, or a computer-readable recording medium such as a CD-ROM, or any combination of systems, methods, integrated circuits, computer programs, or computer-readable recording media.

The following describes in detail an embodiment with reference to the drawings.

The embodiment described below shows a general or specific example. The numerical values, shapes, materials, structural elements, the arrangement and connection of the structural elements, steps, the processing order of the steps etc. shown in the embodiment are mere examples, and therefore do not limit the scope of the appended Claims and their equivalents. Therefore, among the structural elements in the embodiment, structural elements not recited in any one of the independent claims are described as arbitrary structural elements.

Embodiment

Figure 2:
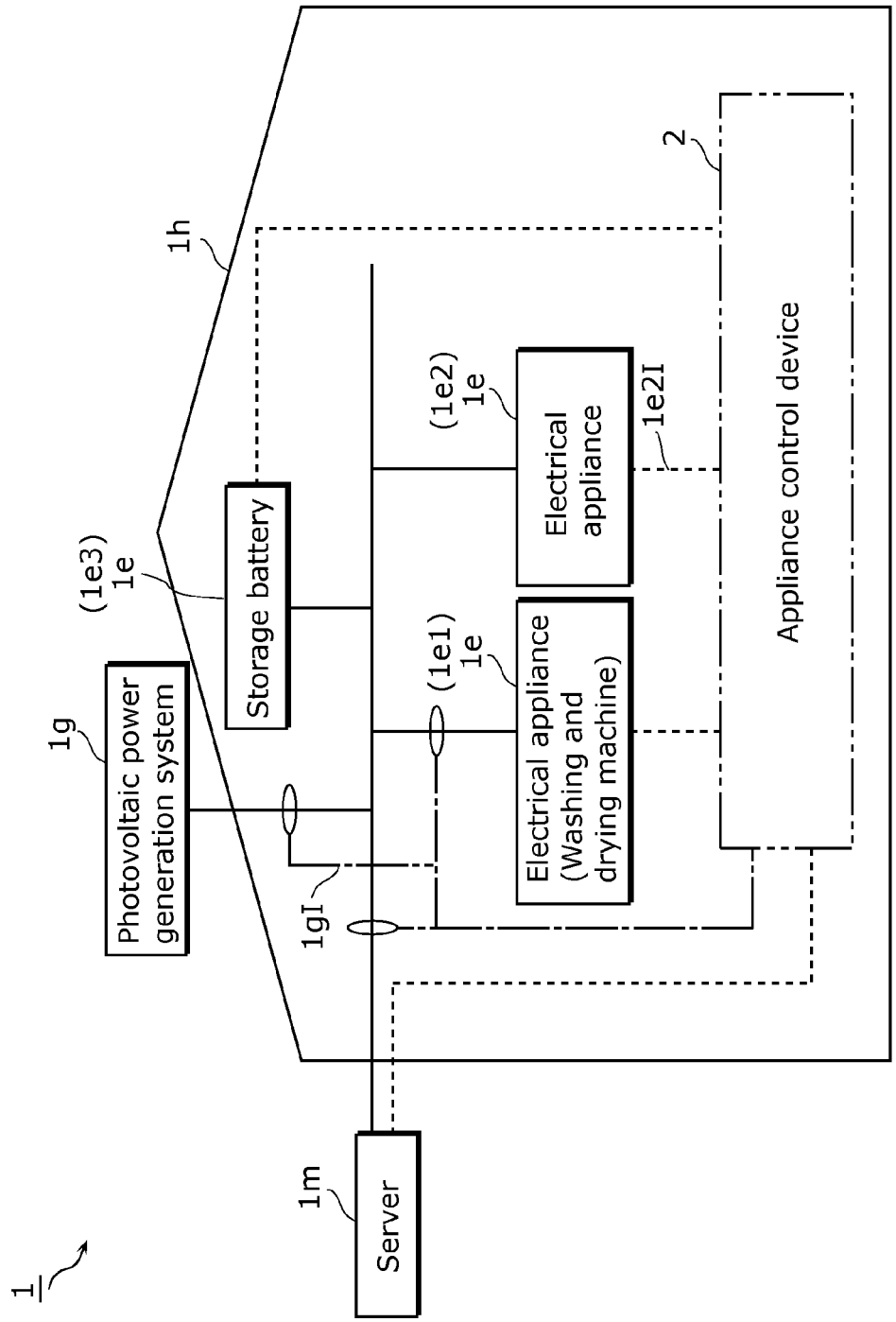
FIG. 2 is a diagram showing a system.

FIG. 2 is a diagram showing a system 1.

The system 1 includes a photovoltaic power generation system 1g, at least one electric appliance 1e, and an appliance control device 2, for instance.

The electric appliance 1e is capable of performing operations that differ in power usage (power consumption). Here, the electric appliance 1e is assumed to be capable of performing a first operation and a second operation. The first operation needs a long time for completion, but consumes less power and has a small total amount of consumed power from the start to end of the operation. The second operation needs a short time for completion, but consumes more power and has a large total amount of consumed power from the start to end of the operation (see aforementioned FIG. 1).

The electric appliance 1e is, for example, a washing and drying machine that performs washing and drying. Moreover, for instance, the first operation is an operation to wash and dry clothes, and the second operation is an operation to wash and dry clothes with second power consumption different from power consumption when the first operation is performed and a second operation time different from an operation time of the first operation.

The system 1 is provided to, for example, a house 1h such as an ordinary family house.

Figure 3:
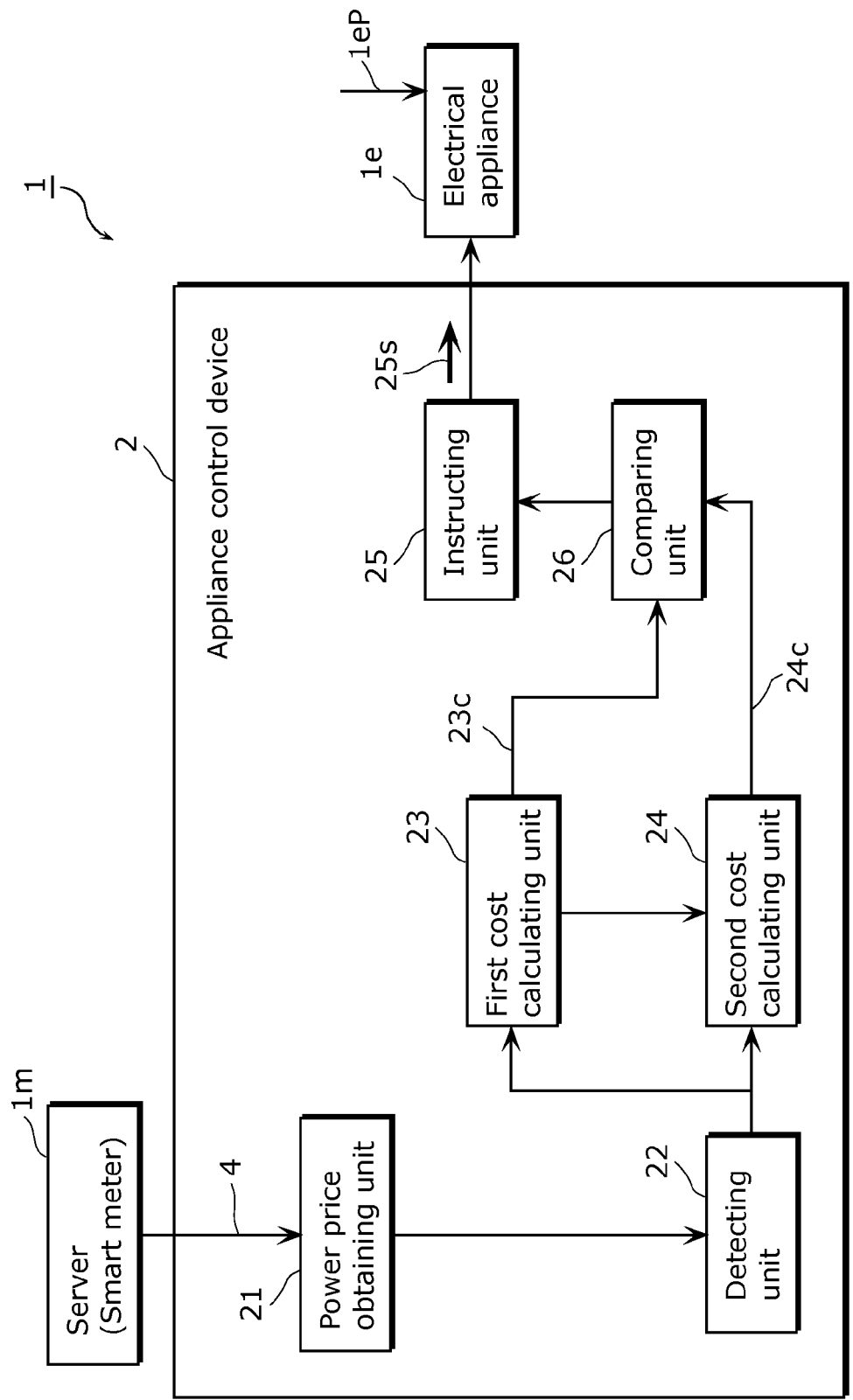
FIG. 3 is a diagram showing a configuration of an appliance control device.

FIG. 3 is a diagram showing a configuration of the appliance control device 2.

The appliance control device 2 includes a power price obtaining unit 21, a detecting unit 22, a first cost calculating unit 23, a second cost calculating unit 24, a comparing unit 26, and an instructing unit 25.

It is to be noted that at least part of the appliance control device 2 may be, for example, a computer including a CPU, a ROM, a RAM, and so on. The appliance control device 2 may achieve functions of the power price obtaining unit 21 and so on by the computer executing a program or the like stored in the ROM. Moreover, at least part of the appliance control device 2 may be realized by an integrated circuit.

Figure 4:
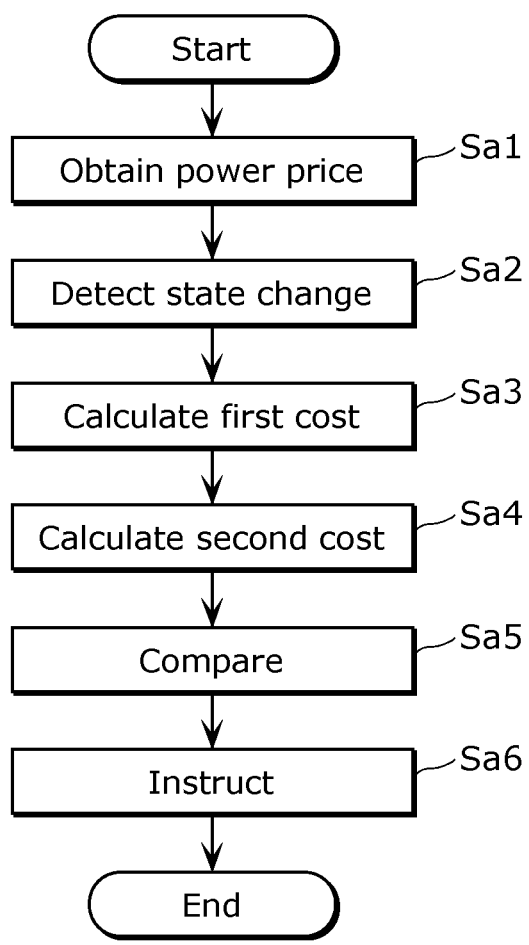
FIG. 4 is a flow chart showing operations performed by the appliance control device.

FIG. 4 shows a flow chart for the appliance control device 2.

The power price obtaining unit 21 (FIG. 3) obtains information 4 from a device 1m (FIG. 3 or the like) outside of the appliance control device 2 (Sa1 in FIG. 4).

It is to be noted that the device 1m may be, for instance, a smart meter provided to the house 1h or a server provided outside of the house 1h. For example, the information 4 may be transmitted from the device 1m, the outside server, to a smart meter provided to the house 1h. With this, the power price obtaining unit 21 may obtain the transmitted information 4 through the smart meter.

Figures 5, 6A, 6B, 7A:
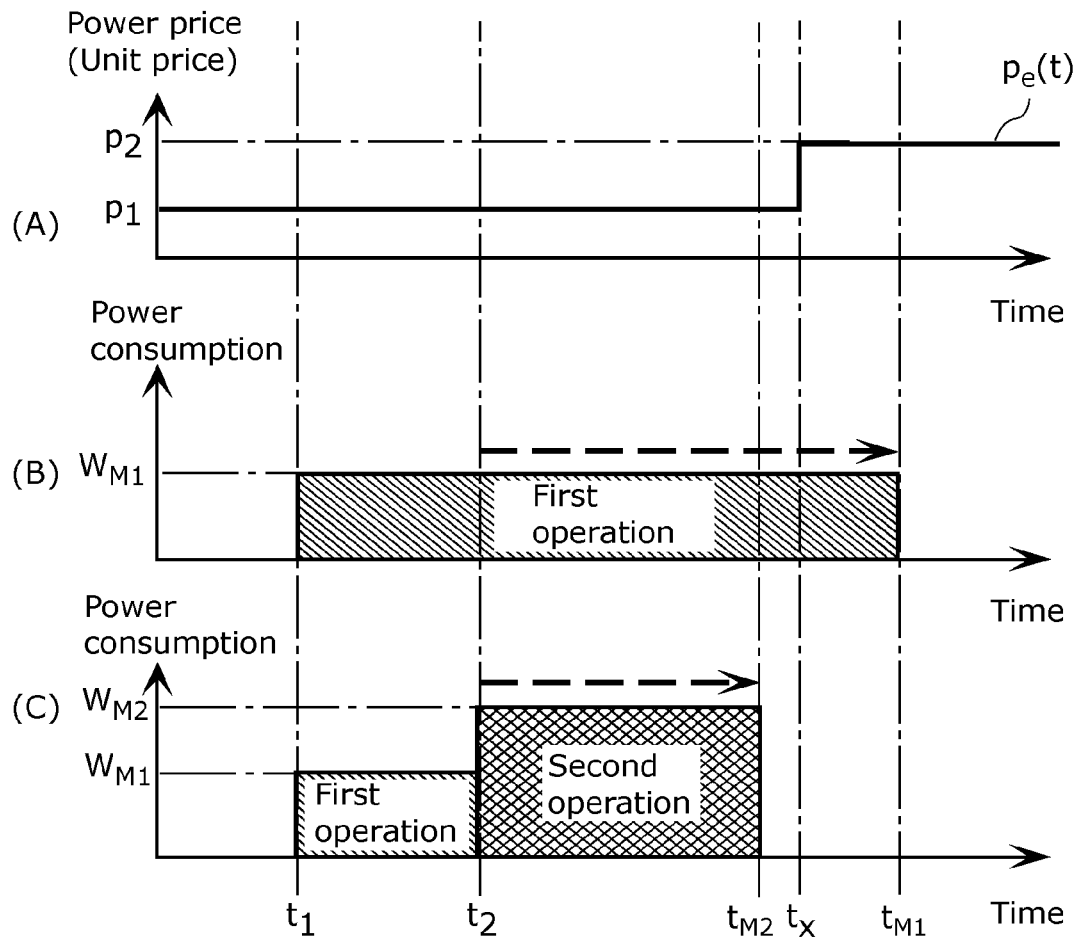
FIG. 5 is a diagram of which (A) shows a power price, and (B) and (C) each show an operation performed by the system.
FIG. 6A shows an exemplary equation for a first cost.
FIG. 6B shows an exemplary equation for a second cost.
FIG. 7A shows an exemplary equation for a first cost.

FIG. 5 is a diagram illustrating processes performed by the detecting unit 22, the first cost calculating unit 23, the second cost calculating unit 24, the comparing unit 26, and the instructing unit 25.

FIG. 5 shows a case where the electric appliance 1e starts the first operation at time $t_1$, and the power price obtaining unit 21 obtains information (above-mentioned) indicating unit price of power at time $t_2$.

(A) in FIG. 5 shows a relationship between a time (horizontal axis) and a unit price of power (vertical axis). $p_e(t)$ is a price per unit amount of power (unit price) at time t. $p_e(t)$ is a price for using commercial power having a predetermined unit amount (e.g., 1 kWh) that a user or the like of the electric appliance 1e pays to a power company or the like in the case where the commercial power is used. The unit price of power is set based on supply, and sometimes changes depending on a time period. The power company sets the unit price of power to be higher in a time period when power is in high demand, and the unit price of power to be lower in a time period when power is in low demand. FIG. 5 shows a case where a unit price of power before time $t_x$ is $p_1$, and a unit price of power after the time $t_x$ is $p_2$.

(B) in FIG. 5 shows a relationship between passage of time from a start of operation to an end of operation (horizontal axis), and power consumption of the electric appliance 1e (vertical axis) when the electric appliance 1e continuously performs the first operation after the time $t_2$.

(C) in FIG. 5 shows a relationship between passage of time from a start of operation to an end of operation, and power consumption of the electric appliance 1e when the first operation being performed is switched to the second operation and the electric appliance 1e performs the second operation after the time $t_2$.

It is to be noted that although, for the sake of brevity, power consumption in the first operation and power consumption in the second operation are respectively described as $W_{M1}$ and $W_{M2}$ that are fixed power values in (B) and (C) in FIG. 5, the power consumption may vary.

The detecting unit 22 determines whether or not a unit price of power changes in a period during which the electric appliance 1e operates, using information (above-mentioned) that indicates the unit price of power and is obtained by the power price obtaining unit 21 (Sa2 in FIG. 4).

In an example shown in FIG. 5, because the unit price of power $p_e(t)$ changes from $p_1$ to $p_2$ at the time $t_x$, and the time $t_x$ is earlier than estimated operation end time $t_{M1}$ in the case where the electric appliance 1e continuously performs the first operation after the time $t_2$, the detecting unit 22 determines that the unit price of power changes in the period during which the electric appliance 1e operates.

When the detecting unit 22 determines that the unit price of power changes in the period during which the electric appliance 1e operates, the first cost calculating unit 23 calculates a first cost $C_{M1}$ produced when the electric appliance 1e continuously performs the first operation after the time $t_2$ ((B) in FIG. 5) (Sa3 in FIG. 4).

FIG. 6A shows an equation for the first cost $C_{M1}$.

It is to be noted that the equation shown in FIG. 6A is a mere example. Hereinafter, a description for specifying such a statement is omitted properly.

In an example shown by (B) in FIG. 5, the first cost $C_{M1}$ is a price for an amount of power used when the electric appliance 1e operates with power consumption $W_{M1}$ from operation start time $t_1$ to the estimated operation end time $t_{M1}$. Moreover, the unit price of power is $p_1$ from the time $t_1$ to the time $t_x$, and $p_2$ from the time $t_x$ to the time $t_{M1}$. Consequently, the first cost $C_{M1}$ is a price obtained by adding the following two products (the first and second terms on the right side of the equation shown in FIG. 6A). In other words, one of the products (first term) is between the unit price of power $p_1$ before the time $t_x$ when the unit price of power changes, and an amount of consumed power ($W_{M1} \times (t_x - t_1)$) before the time $t_x$. The other of the products (second term) is between the unit price of power ($p_2$) after the time $t_x$ when the unit price of power changes, and an mount of consumed power ($W_{M2} \times (t_{M1} - t_x)$) after the time $t_x$.

It is to be noted that in the case of FIG. 5, an amount of consumed power can be obtained by multiplying together power consumption ($W_{M1}$ in the above example) and an operation period ($t_x - t_1$, $t_{M1} - t_x$).

As stated above, the first cost $C_{M1}$ can be specifically calculated by the equation shown in FIG. 6A or the like.

FIG. 6B shows an equation for a second cost $C_{M2}$.

When the detecting unit 22 determines that the unit price of power changes in the period during which the electric appliance 1e operates, the second cost calculating unit 24 calculates the second cost $C_{M2}$ produced when the electric appliance 1e switches the first operation to the second operation and performs the second operation from a predetermined time later than the time $t_2$ (time $t_2$ in the example shown by (B) in FIG. 5) (Sa4 in FIG. 4).

In the case of FIG. 5, the electric appliance 1e switches the first operation to the second operation and performs the second operation at the time $t_2$. For this reason, the second cost $C_{M2}$, is a price for an amount of power used when the electric appliance 1e operates with the power consumption $W_{M1}$ from the operation start time $t_1$ to the time $t_2$ and operates with power consumption $W_{M2}$ from the time $t_2$ to estimated operation end time $t_{M2}$. Here, the time $t_x$ when the unit price of power changes from $p_1$ to $p_2$ is a time later than the estimated operation end time $t_{M2}$. The unit price of power in an operation period (a period until the time $t_{M2}$) of the electric appliance is $p_1$. Consequently, the second cost $C_{M2}$, is a price obtained by adding the following two products (the first and second terms on the right side of the equation shown in FIG. 6B). In other words, one of the products is between the unit price of power $p_1$ and an amount of consumed power $(W_{M1} \times (t_2-t_1))$ in the period (the times $t_1$ to $t_2$) during which the electric appliance 1e performs the first operation. The other of the products is between the unit price of power $p_1$ and an amount of consumed power $(W_{M2} \times (t_{M2}-t_2))$ in the period (times $t_2$ to $t_{M2}$) during which the electric appliance 1e performs the second operation.

It is to be noted that in the case of FIG. 5, as with the above example shown by (B) in FIG. 5, the amount of consumed power is also obtained by multiplying together the power consumption ($W_{M1}$, $W_{M2}$) and the operation period ($t_2-t_1$, $t_{M2}-t_2$) in the example shown by (C).

As stated above, the second cost $C_{M2}$ can be specifically calculated by the equation shown in FIG. 6B or the like.

FIG. 7A and FIG. 7B show modifications of the calculations for the first cost $C_{M1}$ and the second cost $C_{M2}$, respectively.

In FIG. 7A and FIG. 7B, a case is considered where power consumption of the electric appliance 1e varies. In addition, cases are considered where the time $t_x$ when the unit price of power $p_e(t)$ changes is earlier than the time $t_{M2}$ and where the time $t_x$ when the unit price of power $p_e(t)$ changes is later than the time $t_{M2}$.

An elapsed time from the operation start time $t_1$ (FIG. 5) to the time t can be represented by $t-t_1$. Consequently, a cost at the time t can be expressed in a product between the unit price of power $p_e(t)$ at the time t and power consumption $W_{M1}(t-t_1)$ of the electric appliance 1e after the time $(t-t_1)$ elapses from the operation start time. To put it another way, the first cost $C_{M1}$ (the left side in FIG. 7A) can be represented by an integral of such a cost from the time $t_1$ to the time $t_{M1}$ (the right side in FIG. 7A).

Likewise, the second cost $C_{M2}$ can be represented by a sum of the following two values. One of the values is obtained by integrating a cost produced at the time $t(p_e(t) \times W_{M1}(t-t_1))$ in a first interval from the operation start time $t_1$ when the electric appliance 1e starts to perform the first operation to the time $t_2$ when the electric appliance 1e stops performing the first operation (the first term on the right side in FIG. 7B). The other of the values is obtained by integrating $(p_e(t) \times W_{M2}(t-t_1'))$ in a second interval from the time $t_2$ when the electric appliance 1e starts to perform the second operation to the estimated operation end time $t_{M2}$ when the electric appliance 1e stops performing the second operation (the second term).

The following describes the above time $t_1'$.

FIG. 7C is a diagram illustrating the time $t_1'$.

As shown in FIG. 7C, there is a progress state S1 of an operation of the electric appliance 1e at time $t_2$ (time $t_2$ in z1, z3) when the electric appliance 1e performs the first operation from time $t_1$ to the time $t_2$. Moreover, there is a progress state S2 at a time ($t_{s1}$, $t_2$) after elapsed time $T_1$ passes from an operation start time (time $t_1$ in z2, time $t_1'$ in z3) and when the electric appliance 1e starts to perform the second operation (refer to "second operation" section). Here, it is assumed that the above progress state S1 matches the progress state S2. When the electric appliance 1e in the progress state S1 at the time $t_2$ switches the first operation to the second operation (z3), the electric appliance 1e performs the following operation (operation between times $t_2$ to $t_{M2}$ in z3). The operation is the second operation (operation between the times $t_2$ and $t_{M2}$ in z4) that is in the progress state S2 during the elapsed time $T_1$ from the operation start (time $t_1'$) and is performed from the time $t_2$ to the operation end (time $t_{M2}$). Thus, an operation state of the electric appliance 1e when the first operation is switched to the second operation at the time $t_2$ (z3) is an operation state (operation state S1) that is the same as an operation state (operation state S2) at the time $t_2$ in the case where the electric appliance 1e starts to perform the second operation (operation in z4) at time $t_1'=t_2-T_1$ that is a time earlier than the time $t_2$ when the switching is performed by the above elapsed time $T_1$. Furthermore, it is assumed that a remaining time to the operation end time $t_M$, is $T_2$ in the case where the electric appliance 1e performs the second operation (operation in z4) until the time $t_2$ after the elapsed time $T_1$ passes from the operation start (time $t_1'$). The estimated operation end time $t_{M2}$ in the case where the electric appliance 1e starts to perform the first operation at the time $t_1$, and switches the first operation to the second operation and performs the second operation at the time $t_2$ (case of z3) is time $t_2+T_2$ after such time $T_2$ passes from the time $t_2$ when the switching is performed.

The comparing unit 26 compares the calculated first cost $C_{M1}$ and second cost $C_{M2}$, and determines a smaller one of the two costs (Sa5 in FIG. 4).

FIG. 7D shows a conditional equation for determining the smaller one of the costs.

The instructing unit 25 instructs the electric appliance 1e to perform an operation at the smaller cost determined by the comparing unit 26 (Sa6 in FIG. 4). Stated differently, there is a case where switching to and performing the second operation can be lower in cost than continuously performing the first operation after the time $t_2$ (FIG. 7C) (refer to z1 in FIG. 7C). In short, such a case is a case where the conditional equation shown in FIG. 7D is satisfied, that is, a case where the second cost $C_{M2}$ is lower than the first cost $C_{M1}$. When the comparing unit 26 determines that the conditional equation shown in FIG. 7D is satisfied, the instructing unit 25 instructs the electric appliance 1e to switch to and perform the second operation (refer to z3). It is to be noted that the second operation is performed in the operation state (operation state S2) during the elapsed time $T_1$ in the case where the second operation is started (case of z4).

It is to be noted that the above-described first cost $C_{M1}$ and second cost $C_{M2}$ each may be a cost produced when an operation is performed after the time $t_2$. In other words, the first cost $C_{M1}$ and the second cost $C_{M2}$ each may be a cost not including a cost in a period from the time $t_1$ to the time $t_2$, that is, a period in which an operation is already performed.

Modifications

Figure 8:
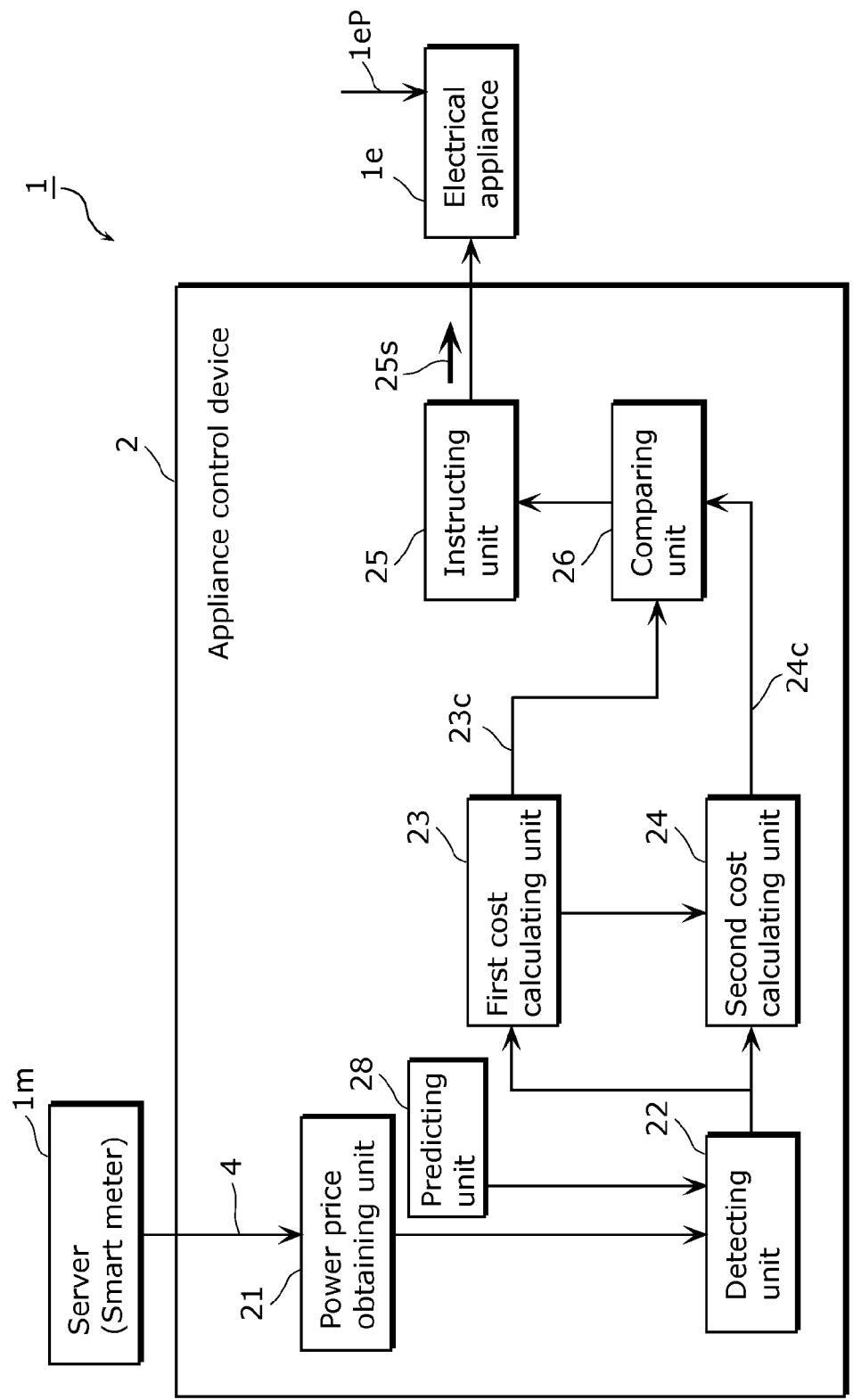
FIG. 8 is a diagram showing a configuration according to Modification 1.

FIG. 8 is a diagram showing a configuration of an appliance control device 2 according to Modification 1.

The appliance control device 2 further includes a predicting unit 28 in addition to the structural elements shown in FIG. 3.

The predicting unit 28 calculates predicted surplus power $W_g(t)$ based on a prediction about generated power of photovoltaic power generation (power generation prediction) and a prediction about power consumption of an electric appliance (e.g., electric appliance 1e2) other than an electric appliance 1e to be controlled (e.g., the electric appliance 1e1 shown in FIG. 2) in a house 1h (power demand prediction).

The detecting unit 22 performs the following determination when the power price obtaining unit 21 obtains information indicating a unit price of power (aforementioned) or the predicting unit 28 calculates the predicted surplus power $W_g(t)$. In other words, in that case, the predicting unit 22 determines whether or not the unit price of power or the surplus power changes in a period during which the electric appliance 1e operates.

The first cost calculating unit 23 and the second cost calculating unit 24 calculate a first cost and a second cost using equations described with reference to FIG. 9B and FIG. 9C, respectively.

Figure 9A:
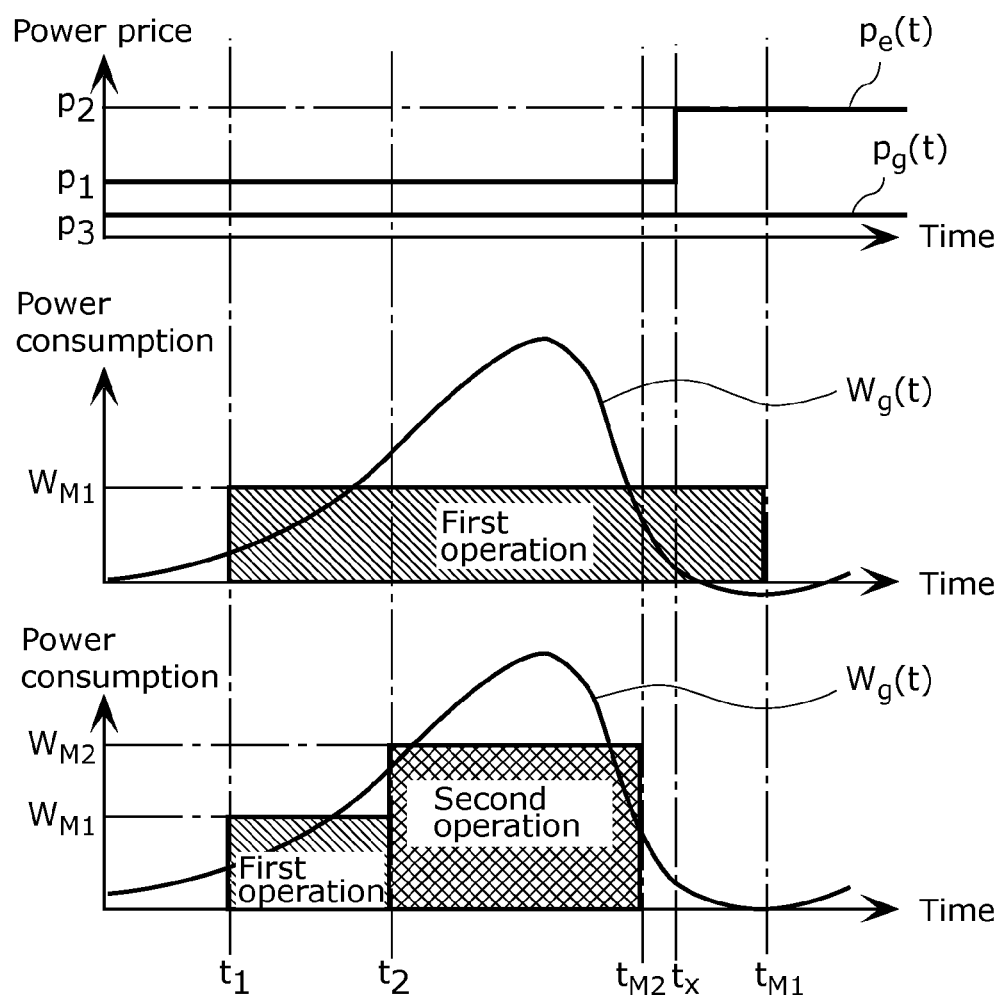
FIG. 9A is a diagram showing operations according to Modification 1.

FIG. 9A is a diagram showing operations according to Modification 1.

Modification 1 describes a cost calculation method when the electric appliance 1e also uses power generated by photovoltaic power generation (generated power) (refer to the photovoltaic power generation system 1g shown in FIG. 2).

It is to be noted that the surplus power refers to power remaining after power used by an electric appliance (electric appliance 1e2) other than the electric appliance 1e (electric appliance 1e1) controlled by the appliance control device 2 is subtracted from the power generated by the photovoltaic power generation system 1g.

A unit price of purchased power $p_e(t)$ shown by the upper tier among the upper, middle, and lower tiers of FIG. 9A is a unit price of power supplied from commercial power and purchased by a user, a resident of the house 1h, from a power company at time t. Here, the unit price of purchased power $p_e(t)$ rises from $p_1$ to $p_2$ at time $t_r$.

A unit price of generated power $p_g(t)$ shown by the upper tier is a unit price of power generated by the photovoltaic power generation system 1g. The unit price of generated power $p_g(t)$ may be set as 0 yen on the supposition that a running cost of the photovoltaic power generation system is 0 yen, for instance. A cost such as a cost per unit amount of generated power calculated from the initial investment, the service life, an expected amount of generated power during the service life, and so on of the photovoltaic power generation system may be set to the unit price of generated power $p_g(t)$.

$W_g(t)$ shown by the middle tier is surplus power (predicted surplus power) of the photovoltaic power generation.

In FIG. 9A, time $t_1$ is an operation start time. Here, as shown by each of the middle and lower tiers of FIG. 9A, the electric appliance 1e starts to perform the first operation at the time $t_1$. Time $t_2$ is a time when a power price is obtained and a time when it is detected that the power price would change in the future. Time $t_{M1}$ is an operation end time in the case where the first operation is continuously performed after the time $t_2$. Time $t_{M2}$ is an operation end time in the case where a type of operation being performed is switched to another type, and the second operation is performed after the time $t_2$.

FIG. 9B shows an equation for calculating a first cost $C_{M1}$ according to Modification 1.

In Modification 1, the electric appliance 1e to be controlled operates using the surplus power of the photovoltaic power generation. However, when the surplus power is less than the power consumption of the electric appliance 1e, commercial power is used as much as the power shortage.

For instance, when magnitude of the power consumption $W_{M1}$, $W_{M2}$ and the surplus power $W_g(t)$ of the electric appliance 1e is in a relationship as shown by FIG. 9A, the power consumption $W_{M1}$ of the electric appliance 1e at the operation start time $t_1$ is made up of surplus power $W_g(t_1)$ of the photovoltaic power generation and $W_{M1}-W_g(t_1)$ provided from commercial power.

Moreover, because surplus power $W_g(t_2)$ is larger than the power consumption $W_{M1}$ of the electric appliance 1e at the time $t_2$ in the case where the first operation is continuously performed after the time $t_2$ (case of the middle tier), the electric appliance 1e uses only the surplus power of the photovoltaic power generation.

With this, the first cost $C_{M1}$ at the time $t_1$ according to Modification 1 is obtained by an equation enclosed in curly brackets { } shown in the right side of the equation shown in FIG. 9B. The first term in the equation enclosed in the curly brackets is a cost produced when the surplus power of the photovoltaic power generation is used, and a product between the unit price of generated power $p_g(t)$ and a smaller one of the surplus power $W_g(t)$ of the photovoltaic power generation and power consumption $W_{M1}(t-t_1)$ at the time t in the case where the electric appliance 1e performs the first operation from the time $t_1$. The second term is a cost produced when the commercial power is used, and a product between the unit price of purchased power $p_e(t)$ and a larger one of $W_{M1}(t-t_1)-W_g(t)$, the shortage of the surplus power, and 0. The first cost $C_{M1}$ is obtained by integrating a sum of the first term product and the second term product in intervals from the time $t_1$ to time $t_{M1}$.

FIG. 9C shows an equation for calculating a second cost $C_{M2}$ according to Modification 1.

The second cost $C_{M2}$ can be calculated by adding a cost (the first term on the right side) in a period, from the time $t_1$ to the time $t_2$, during which the electric appliance 1e performs the first operation, and a cost (the second term) in a period, from the time $t_2$ to the time $t_{M2}$, during which the electric appliance 1e performs the second operation.

The cost in the period during which the electric appliance 1e performs the first operation (first term) is obtained by integrating a sum of the following first product and second products. The first product is between the unit price of generated power $p_g(t)$ and a smaller one of the surplus power $W_g(t)$ of the photovoltaic power generation and the power consumption $W_{M1}(t-t_1)$ at the time t in the case where the electric appliance 1e performs the first operation from the time $t_1$. The second product is between the unit price of purchased power $p_e(t)$ and a larger one of $W_{M1}(t-t_1)-W_g(t)$, the shortage of the surplus power, at the time t, and 0. The cost of the first term is obtained by integrating the sum of the first and second products from the time $t_1$ to the time $t_2$.

The cost in the period during which the electric appliance 1e performs the second operation (second term) is obtained by integrating a sum of the following first product and second products. The first product is between the unit price of generated power $p_g(t)$ and a smaller one of the surplus power $W_g(t)$ of the photovoltaic power generation and the power consumption $W_{M2}(t-t_1')$ at the time t in the case where the electric appliance 1e performs the first operation from the time $t_1'$. The second product is between the unit price of purchased power $p_e(t)$ and a larger one of $W_{M2}(t-t_1')-W_g(t)$, the shortage of the surplus power, at the time t, and 0. The cost of the second term is obtained by integrating the sum of the first and second products from the time $t_2$ to the time $t_{M2}$.

Modification 2 describes a cost calculation method in consideration of quality deterioration of the electric appliance 1e.

Figures 10A, 10B:
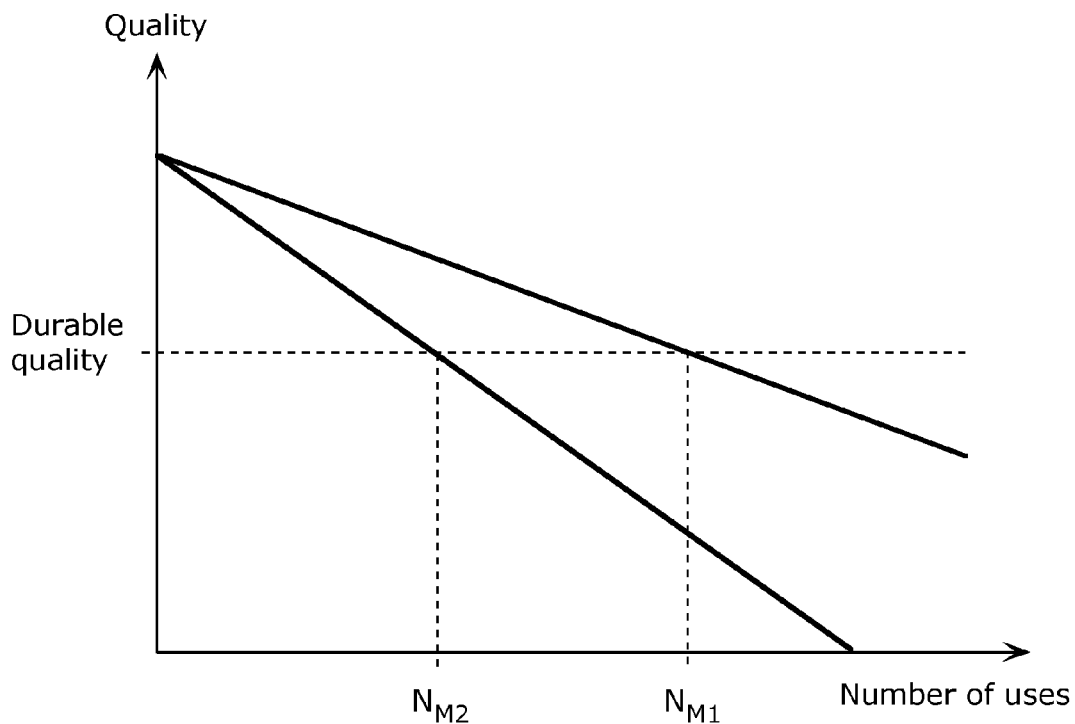
FIG. 10A is a graph showing a change in quality of an electric appliance.
FIG. 10B shows an equation according to Modification 2.

FIG. 10A is a graph showing a relationship between the number of times the electric appliance 1e is used and quality of the electric appliance 1e according to Modification 2.

The quality exceeds durable quality (see horizontal broken line) at the start of use. In an example shown in FIG. 10A, quality deterioration linearly increases with respect to the number of uses (horizontal axis).

In FIG. 10A, $N_{M1}$ shows the maximum number of uses at which the quality of the electric appliance 1e exceeds the durable quality when the electric appliance 1e repeatedly completes the first operation. $N_{M2}$ shows the maximum number of uses at which the quality of the electric appliance 1e exceeds the durable quality when the electric appliance 1e repeatedly completes the second operation.

FIG. 10B shows an equation for calculating a first cost $C_{M1}$ according to Modification 2.

FIG. 10B shows a cost of a single operation of the electric appliance 1e when the electric appliance 1e deteriorates according to the number of the uses as shown in FIG. 10A.

In FIG. 10B, the first cost $C_{M1}$ is calculated by adding a cost for a total amount of power used from the start to end of operation by the electric appliance 1e to a cost (value 1er in the right side shown in FIG. 10B) produced by the quality deterioration of the electric appliance 1e per single operation. A value obtained by dividing an initial investment cost $P_{initial}$, the price of the electric appliance 1e, by the maximum number of uses $N_{M1}$ of the electric appliance 1e when the first operation is repeated is used for the cost produced by the quality deterioration per single operation.

Regarding the first term on the right side shown in FIG. 10B, please refer to the equation shown in FIG. 7A, for instance.

FIG. 10C shows an equation for calculating a second cost $C_{M2}$ according to Modification 2.

The second cost CM2 calculated by this equation is a cost of a single operation by the electric appliance be when the electric appliance 1e deteriorates according to the number of the uses as shown in FIG. 10A.

In FIG. 10C, the second cost $C_{M2}$ is a sum of a cost (the first and second terms on the right side) for a total amount of power used from the start to end of operation by the electric appliance 1e and a cost (the third and fourth terms) produced by the quality deterioration of the electric appliance 1e per single operation. The cost (the third and fourth terms) produced by the quality deterioration of the electric appliance be per single operation is a sum of a cost (the third term) produced by the first operation from the time $t_1$ to the time $t_2$ and a cost (the fourth term) produced by the second operation from the time $t_2$ to the time $t_{M2}$.

The cost (the third term) produced by the quality deterioration caused by the first operation is calculated by multiplying a value obtained by dividing the price $P_{initial}$ of the electric appliance be by the maximum number of the uses $N_{M1}$ when the first operation is repeated, by a ratio $((t_2-t_1)/(t_{M1}-t_1))$ of a period during which the first operation is actually performed to an operation period in the case where the first operation is performed from its start to end.

The cost (the fourth term) produced by the quality deterioration caused by the second operation is calculated by multiplying a value obtained by dividing the price $P_{initial}$ of the electric appliance 1e by the maximum number of uses $N_{M2}$ when the second operation is repeated, by a ratio $((t_{M2}-t_2)/(t_{M2}-t_1))$ of a period during which the second operation is actually performed to an operation period in the case where the second operation is performed from its start to end.

Figure 11:
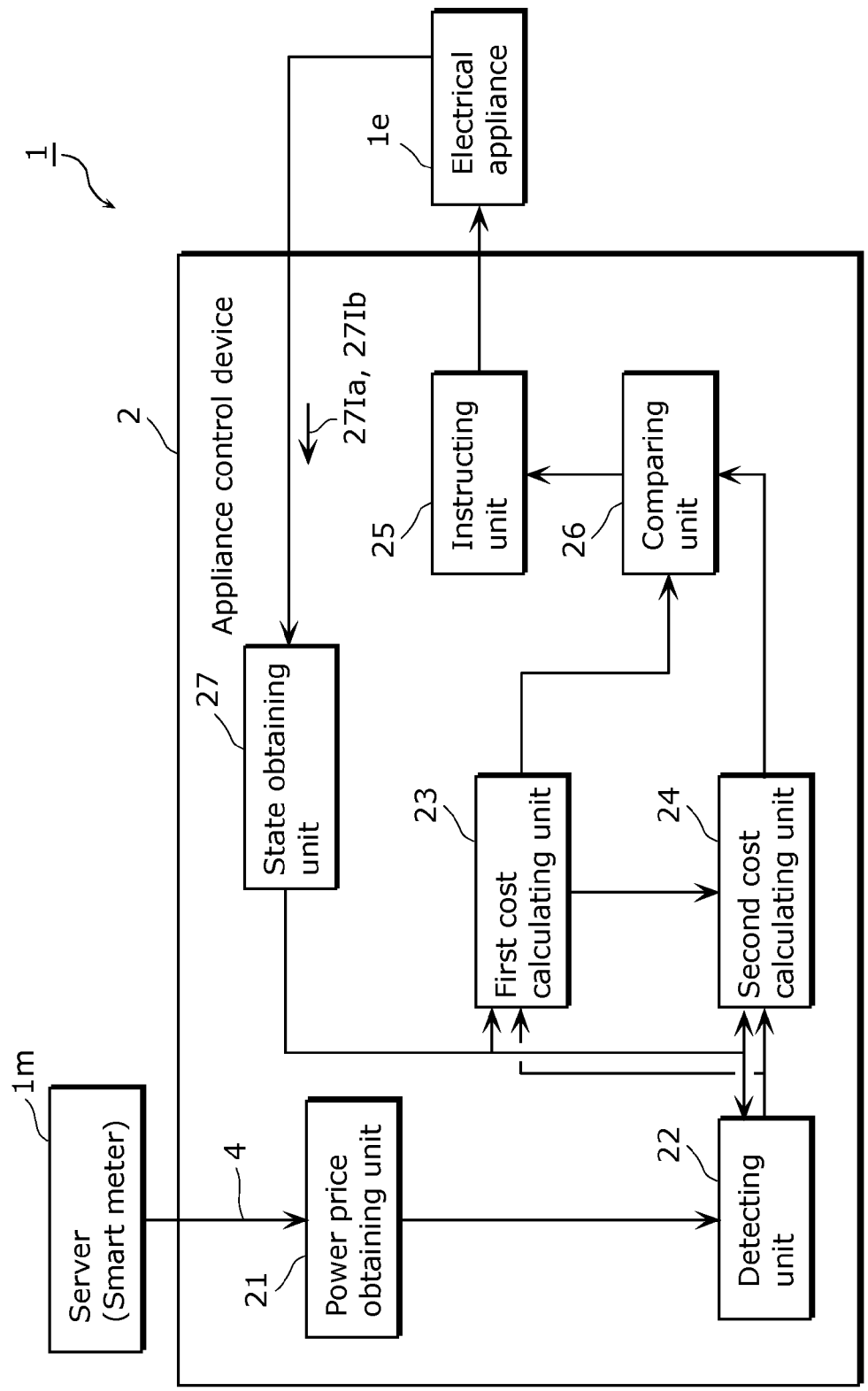
FIG. 11 is a diagram showing a configuration according to Modification 3.

FIG. 11 shows a configuration of an appliance control device 2 according to Modification 3.

The appliance control device 2 further includes a state obtaining unit 27 in addition to the structural elements shown in FIG. 3.

The state obtaining unit 27 obtains information indicating an operation state (information 27Ia) from the electric appliance 1e. The state obtaining unit 27 is capable of identifying a progress indicating which step is completed among all steps from the start to end of an operation, based on the obtained information. It is to be noted that the progress may be identified as a ratio of an operation time to an entire period from the start to end of the operation. Moreover, the progress may be identified as a ratio of a remaining operation time to the entire period from the start to end of the operation. Furthermore, the progress may be identified as remaining steps each of which is identified.

Figure 12:
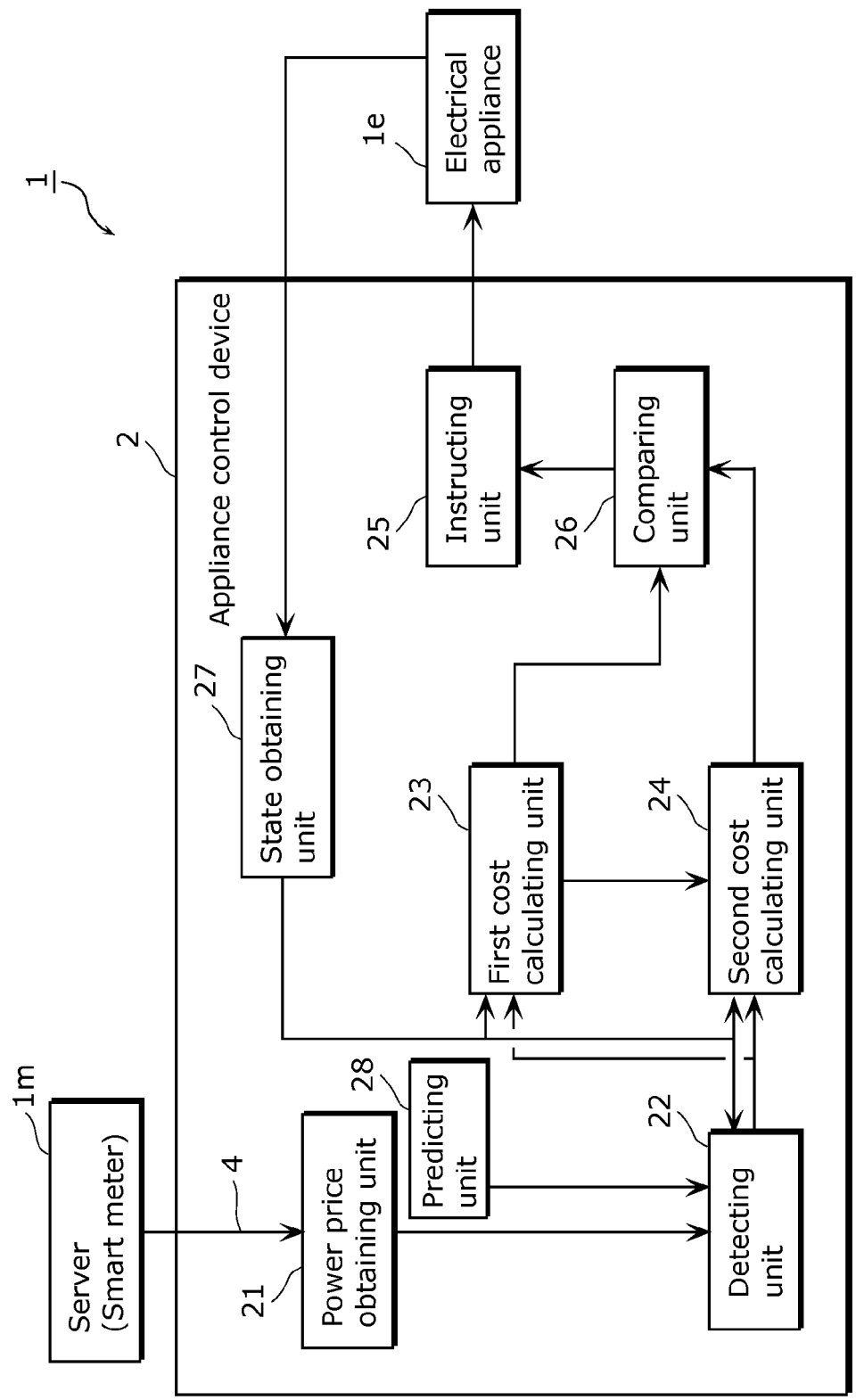
FIG. 12 is a diagram showing a configuration according to Modification 4.

FIG. 12 shows a configuration of an appliance control device 2 according to Modification 4. The appliance control device 2 further includes the predicting unit 28 (refer to FIG. 8) in addition to the structural elements shown in FIG. 11.

FIG. 13 is a diagram showing operations according to Modification 5.

A unit price of power is relatively low in a period from time $t_0$ to time $t_x$. The unit price of power is high in periods other than the period.

The following describes, as an example, an operation to wash and dry laundry, a blanket, that is performed by the electric appliance 1e, a washing and drying machine.

At time $t_{q1}$ a user instructs the electric appliance 1e to complete the operation to wash and dry before the time $t_x$.

The electric appliance 1e estimates first time $t_{E1}$ as a time at which the operation to wash and dry ends when the electric appliance 1e performs the first operation, based on an amount of laundry or the like. However, when estimating again the end time in the case of performing the first operation, at time $t_2$ later than the time $t_{q1}$, the electric appliance 1e sometimes estimates, as the time at which the operation to wash and dry ends, second time $t_{E3}$ different from the first time $t_{E1}$. For instance, there is a case where although the electric appliance 1e estimates the end time with relatively low accuracy before the start of the operation to wash and dry, the electric appliance 1e is capable of estimating, based on an actual operation status, the end time with higher accuracy after the start of the operation to wash and dry.

For example, the time $t_{E1}$ is a time that is estimated with relatively low accuracy before the blanket absorbs water.

Time $t_{E3}$ is a time that is estimated with relatively high accuracy after the blanket absorbs the water and in consideration of much water actually absorbed by the blanket.

The time $t_{E3}$ that is estimated again subsequently is, for instance, the time estimated with such high accuracy, and thus may be different from the first time $t_{E1}$ estimated previously.

The state obtaining unit 27 obtains first information (information 27Ib) from the electric appliance 1e or the like at the time $t_{q1}$. The obtained first information indicates that an operation end time is estimated as the first time $t_{E1}$. Moreover, the state obtaining unit 27 obtains second information (information 27Ib) from the electric appliance 1e or the like at the time $t_2$. The obtained second information indicates that the operation end time is estimated as the second time $t_{E3}$. The end times $t_{E1}$ and $t_{E3}$ may be estimated not by the electric appliance 1e but by the state obtaining unit 27. It is to be noted that each of the first information and the second information may be information or the like with which the state obtaining unit 27 or the like identifies each of the first time $t_{E1}$ and the second time $t_{E3}$ as an estimated operation end time.

The state obtaining unit 27 determines whether or not the second time $t_{E3}$ is later than the first time $t_{E1}$.

It is to be noted that instead of the state obtaining unit 27, the detecting unit 22 may determine whether or not the second time $t_{E3}$ is later than the first time $t_{E1}$.

When it is determined that the time $t_{E3}$ is not later than the time $t_{E1}$, the instructing unit 25 instructs the electric appliance 1e to continuously perform the first operation after the time $t_2$.

As shown in FIG. 13, the second time $t_{E3}$ is later than the first time $t_{E1}$, and the unit price of power sometimes becomes higher at the time $t_x$ between the time $t_{E1}$ and the time $t_{E3}$. In this case, it may be possible to reduce a cost produced at the operation end more when the second operation that ends in a short time is switched to and performed (refer to J3 in FIG. 13) than when the first operation is continuously performed (refer to J2 in FIG. 13).

The first cost calculating unit 23 calculates a cost produced when the first operation (operation in J2) is continuously performed after the time $t_2$. The second cost calculating unit 24 calculates a cost produced when the second operation (operation in J3) is performed after the time $t_2$. The comparing unit 26 compares the two calculated costs to determine which one of the operations produces a lower one of the costs.

It is to be noted that the cost that is calculated and produced when the first operation is continuously performed to the end may be a cost produced between the times $t_2$ and $t_{E3}$, or an entire cost between the times $t_1$ and $t_{E3}$ that includes the cost between the times $t_2$ and $t_{E3}$.

Likewise, the cost that is calculated and produced when the second operation is switched to and performed to the end may also be a cost produced between the times $t_2$ and $t_{M2}$, or an entire cost between the times $t_1$ and $t_{M2}$ that includes the cost between the times $t_2$ and $t_{M2}$.

When it is determined that the time $t_{E3}$ is later than the time $t_{E1}$ (case shown in FIG. 13), the instructing unit 25 instructs the electric appliance 1e to perform the operation determined by the comparing unit 26. In other words, when continuously performing the first operation produces a lower cost, the instructing unit 25 instructs the electric appliance 1e to continuously perform the first operation (J2). When switching to and performing the second operation produces a lower cost, the instructing unit 25 instructs the electric appliance 1e to switch to and perform the second operation (J3).

As stated above, the processing shown in FIG. 13 is the same as the aforementioned processing.

To put it another way, the appliance control device 2 controls the electric appliance 1e that performs one of the first operation (J2) during a first period (e.g., from $t_2$ to $t_{E3}$ in FIG. 13) and the second operation (J3) during a second period (e.g., from $t_2$ to $t_{M2}$).

The power price obtaining unit 21 obtains information 4 indicating a price of power 1eP (e.g., aforementioned $P_e(t)$).

The detecting unit 22 detects a change in the price (change at the time $t_x$) which is in a not shorter (longer) one of the first period and the second period (first period from times $t_2$ to $t_{E3}$) and indicated in the obtained information 4.

When the change is detected (case shown in FIG. 13), the first cost calculating unit 23 calculates a first cost 23c produced when the electric appliance 1e performs the first operation during the first period (case shown in J2).

When the change is detected, the second cost calculating unit 24 calculates a second cost 24c produced when the electric appliance 1e performs the second operation during the second period (case shown in J3).

The comparing unit 26 compares the first cost 23c and the second cost 24c to determine which one of the operations produces a not higher (lower) one of the costs.

The instructing unit 25 instructs the electric appliance 1e to perform the determined operation.

With this, even in the example shown in FIG. 13, the same advantageous effects as those of the aforementioned processing can be gained according to the same principle as the aforementioned processing.

The present invention includes the structural elements that achieve the above principle, and produces the above advantageous effects due to the operations of the structural elements. The present invention differs from the conventional techniques in these structural elements, operations, and advantageous effects.

Each of the structural elements in the above-described embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the control device according to the embodiment is a program described below.

The program causes a computer to execute, for the computer to control an electric appliance that performs one of a first operation during a first period and a second operation during a second period: obtaining information indicating a price of power; detecting a change in the price in a not shorter one of the first period and the second period, the price being indicated in the obtained information; calculating a first cost produced when the electric appliance performs the first operation, in the case where the change is detected; calculating a second cost produced when the electric appliance performs the second operation, in the case where the change is detected; comparing the first cost and the second cost to determine which one of the first operation and the second operation produces a not higher one of the first cost and the second cost; and instructing the electric appliance to perform the determined one of the first operation and the second operation.

Although the control device according to one or more aspects is described above based on the embodiment, the present invention is not limited to the embodiment. Those skilled in the art will readily appreciate that various modifications may be made in the embodiment and that other embodiments may be obtained by combining structural elements in different embodiments, without departing from the spirit of the present invention. Accordingly, all such modifications and embodiments may be included in the scope of the one or more aspects.

The present invention makes it possible to avoid instructing an electric appliance to perform an operation that produces a high cost, and to more surely give the electric appliance a more appropriate instruction. The present invention is applicable to a control device or the like that gives the electric appliance an instruction to perform an operation.

REFERENCE SIGNS LIST

1h House
1e Electric appliance

1*er* Value
1*e*P Power
1*g* Photovoltaic power generation system
1GI Information
2. Appliance control device
4. Information
4*p*, 4*p*1, 4*p*2 Unit price
4*px* Cost
5*a*A, 5*b*A, 5*a*J Amount of power
21 Power price obtaining unit
22 Detecting unit
23 First cost calculating unit
24 Second cost calculating unit
25 Instructing unit
25*s* Instruction
26 Comparing unit
27 State obtaining unit
27I*a*, 27I*b* Information
28 Predicting unit

The invention claimed is:

1. A control device that controls an electric appliance that performs one of a first operation during a first period and a second operation during a second period, the electric appliance consuming (i) first power when the electric appliance performs the first operation and (ii) second power different from the first power when the electric appliance performs the second operation, the control device comprising:
   a non-transitory memory configured to store a program; and
   a hardware processor configured to execute the program and cause the control device to operate as:
   a price obtaining unit configured to obtain information indicating a price of power;
   a detecting unit configured to detect a change in the price in a longer one of the first period and the second period, the price being indicated in the obtained information;
   a first calculating unit configured to calculate, using the first power, a first cost produced when the electric appliance performs the first operation from a point in time when the change is detected, in the case where the change is detected;
   a second calculating unit configured to calculate, using the second power, a second cost produced when the electric appliance performs the second operation from the point in time when the change is detected, in the case where the change is detected;
   a comparing unit configured to compare the first cost and the second cost to determine which one of the first operation and the second operation produces a lower one of the first cost and the second cost; and
   an instructing unit configured to instruct the electric appliance to perform the determined one of the first operation and the second operation from the point in time when the change is detected.

2. The control device according to claim 1, further comprising
   a state obtaining unit configured to obtain, from the electric appliance, information indicating an operation state of the electric appliance.

3. The control device according to claim 1, further comprising
   a predicting unit configured to predict an amount of surplus power based on an amount of power consumed by a different electric appliance from the electric appliance, and an amount of power generated by a photovoltaic power generation system,
   wherein the first calculating unit and the second calculating unit are configured to calculate the first cost and the second cost, respectively, based on the price indicated in the information obtained by the price obtaining unit, the predicted amount of surplus power, and power consumption of the electric appliance which the instructing unit instructs to perform the determined one of the first operation and the second operation.

4. The control device according to claim 1,
   wherein the first calculating unit and the second calculating unit are configured to calculate the first cost and the second cost, respectively, based on the price indicated in the information obtained by the price obtaining unit, and a depreciation converted from a cost of quality deterioration of the electric appliance that is instructed to perform the determined one of the first operation and the second operation.

5. The control device according to claim 2,
   wherein the detecting unit is configured to detect a change of an estimated operation end time of the electric appliance of which the operation state is indicated, based on the obtained information indicating the operation state of the electric appliance.

6. An integrated circuit that controls an electric appliance that performs one of a first operation during a first period and a second operation during a second period, the electric appliance consuming (i) first power when the electric appliance performs the first operation and (ii) second power different from the first power when the electric appliance performs the second operation, the integrated circuit comprising:
   a non-transitory memory configured to store a program; and
   a hardware processor configured to execute the program and cause the integrated circuit to operate as:
   a price obtaining unit configured to obtain information indicating a price of power;
   a detecting unit configured to detect a change in the price in a longer one of the first period and the second period, the price being indicated in the obtained information;
   a first calculating unit configured to calculate, using the first power, a first cost produced when the electric appliance performs the first operation from a point in time when the change is detected, in the case where the change is detected;
   a second calculating unit configured to calculate, using the second power, a second cost produced when the electric appliance performs the second operation from the point in time when the change is detected, in the case where the change is detected;
   a comparing unit configured to compare the first cost and the second cost to determine which one of the first operation and the second operation produces a lower one of the first cost and the second cost; and
   an instructing unit configured to instruct the electric appliance to perform the determined one of the first operation and the second operation from the point in time when the change is detected.

7. A control method for controlling an electric appliance that performs one of a first operation during a first period and a second operation during a second period, the electric appliance consuming (i) first power when the electric appliance performs the first operation and (ii) second power different from the first power when the electric appliance performs the second operation, the control method comprising:

obtaining, using a hardware processor, information indicating a price of power;

detecting, using the hardware processor, a change in the price in a longer one of the first period and the second period, the price being indicated in the obtained information;

calculating, using the hardware processor and the first power, a first cost produced when the electric appliance performs the first operation from a point in time when the change is detected, in the case where the change is detected;

calculating, using the hardware processor and the second power, a second cost produced when the electric appliance performs the second operation from the point in time when the change is detected, in the case where the change is detected;

comparing, using the hardware processor, the first cost and the second cost to determine which one of the first operation and the second operation produces a lower one of the first cost and the second cost; and instructing, using the hardware processor, the electric appliance to perform the determined one of the first operation and the second operation from the point in time when the change is detected.

8. A non-transitory computer-readable recording medium storing a program for controlling an electric appliance that performs one of a first operation during a first period and a second operation during a second period, the electric appliance consuming (i) first power when the electric appliance performs the first operation and (ii) second power different from the first power when the electric appliance performs the second operation, the program causing a computer to execute steps comprising:

obtaining information indicating a price of power;

detecting a change in the price in a longer one of the first period and the second period, the price being indicated in the obtained information;

calculating, using the first power, a first cost produced when the electric appliance performs the first operation from a point in time when the change is detected, in the case where the change is detected;

calculating, using the second power, a second cost produced when the electric appliance performs the second operation from the point in time when the change is detected, in the case where the change is detected;

comparing the first cost and the second cost to determine which one of the first operation and the second operation produces a lower one of the first cost and the second cost; and instructing the electric appliance to perform the determined one of the first operation and the second operation from the point in time when the change is detected.

* * * * *